US007630574B2

(12) United States Patent
Yamada (10) Patent No.: US 7,630,574 B2
(45) Date of Patent: Dec. 8, 2009

(54) IMAGE ENCODING METHOD AND IMAGE APPARATUS (75) Inventor: Hideaki Yamada, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 907 days.

(21) Appl. No.: 10/479,878

(22) PCT Filed: Jun. 6, 2002

(86) PCT No.: PCT/JP02/05580

§ 371 (c)(1),
(2), (4) Date: Jul. 12, 2004

(87) PCT Pub. No.: WO02/102056

PCT Pub. Date: Dec. 19, 2002

(65) Prior Publication Data

US 2004/0234148 A1 Nov. 25, 2004

(30) Foreign Application Priority Data

Jun. 6, 2001 (JP) .............................. 2001-171237

(51) Int. Cl.
*G06K 9/38* (2006.01)
*G06K 9/40* (2006.01)
*G06K 9/36* (2006.01)
*G06K 9/46* (2006.01)
*G03F 3/08* (2006.01)

(52) U.S. Cl. ...................... 382/273; 382/166; 382/232; 382/275; 358/518

(58) Field of Classification Search ............ 358/426.16, 358/463, 518, 520, 521; 382/163, 164, 165, 382/166, 176, 232, 250, 255, 275

See application file for complete search history.

(56) References Cited

U.S. PATENT DOCUMENTS 5,412,427 A * 5/1995 Rabbani et al. .......... 348/394.1

(Continued)

FOREIGN PATENT DOCUMENTS

| JP | 4-311195 A | 11/1992 |
| JP | 5-130413 | 5/1993 |
| JP | 6-86328 A | 3/1994 |

(Continued)

OTHER PUBLICATIONS

Xerox DocuColor 12 Digital Colour Printer/Copier User Guide. Xerox Europe Technical Centre; Xerox Corporation. 1999. pp. 6-17.*

*Primary Examiner*—Matthew C Bella
*Assistant Examiner*—Michael A Newman
(74) *Attorney, Agent, or Firm*—Nixon & Vanderhye, PC (57) ABSTRACT An object of the invention is to provide an image encoding method and an image apparatus which do not request change on a decoder and can give effects on many applications by having an encoder carry processing for reducing occurrence of noise. A pixel whose tone value is 255 and corresponds to white is changed to a value outside of an extent of the tone value in the inverse direction for black, in other words to a value more than the whitest tone value 255. When an image for which this tone shifting processing is performed is encoded and decoded, a ripple 31 having a larger tone value than 255 occurs in a white portion of the image. Abnormal condition of the image in a shape of ripple on the decoded image existing prior to clipping is centered in a tone value larger than 255. Accordingly, mosquito noise occurs in a portion with a tone value larger than 255 and outside of an extent of the tone value. When this image is clipped by the tone value 255, the mosquito noise can be reduced.

1 Claim, 6 Drawing Sheets

U.S. PATENT DOCUMENTS

| | | | |
|---|---|---|---|
| 5,479,211 A | 12/1995 | Fukuda | |
| 5,742,410 A * | 4/1998 | Suzuki | 358/518 |
| 5,764,862 A * | 6/1998 | Metcalfe et al. | 358/1.2 |
| 6,252,995 B1 * | 6/2001 | Takamori | 382/254 |
| 6,323,957 B1 * | 11/2001 | Ball | 358/1.9 |
| 6,628,833 B1 | 9/2003 | Horie | |
| 6,751,780 B1 * | 6/2004 | Neff et al. | 715/530 |
| 6,771,393 B1 * | 8/2004 | Honary | 358/426.01 |
| 7,038,742 B2 * | 5/2006 | Saitoh et al. | 349/58 |
| 7,099,041 B1 * | 8/2006 | Moriya et al. | 358/1.9 |
| 7,113,227 B1 * | 9/2006 | Kakuya et al. | 348/678 |

FOREIGN PATENT DOCUMENTS

| | | |
|---|---|---|
| JP | 7-50849 A | 2/1995 |
| JP | 11-112978 A | 4/1999 |
| JP | 11-284861 A | 10/1999 |
| JP | 11-308463 A | 11/1999 |
| JP | 2000-175049 | 6/2000 |
| JP | 2000-278689 A | 10/2000 |
| JP | 2000-307879 A | 11/2000 |
| JP | 2001-16447 | 1/2001 |
| JP | 2001-16452 A | 1/2001 |

* cited by examiner

IMAGE ENCODING METHOD AND IMAGE APPARATUS

This application is the US national phase of international application PCT/JP02/05580, filed on 6 Jun. 2002, which designated the US. PCT/JP02/05580 claims priority to JP Application No. 2001-171237 filed on 6 Jun. 2001. The entire contents of these applications are incorporated herein by reference.

TECHNICAL FIELD

The present invention relates to an image encoding method and an image apparatus for compressing an image, more in detail to a method for encoding the image and an image apparatus to reduce mosquito noise occurring when an image including an area with clear edge such as a character or the like is compressed and an original image is reproduced from the compressed image.

BACKGROUND ART

A method using orthogonal transformation as typified by JPEG (Joint Photographic coding Experts Group) is widely used as a conventional method for encoding a natural image such as a photograph.

JPEG is a method for encoding a color static image and of lossy transformation, but has less deterioration of image quality for natural image such as a picture. Consequently, JPEG is used in many applications such as Internet, digital cameras or the like and is also used as a standard image encoding method in a color facsimile.

For instance, the JPEG is used as the standard method for encoding the image in a color facsimile apparatus. Here, explanation about the JPEG to be used for the color facsimile apparatus is given L*a*b* color space is usually used for representing a color of each pixel of the image. When the image is compressed, an original image represented in RGB is transformed to the L*a*b* color space and resolution of a color difference component represented as a* and b* is compressed in half. Next, the image transformed to the color space is divided into blocks composed of 8×8 pixels and each block is transformed to a spatial frequency component by discrete cosine transform (abbreviated as "DCT"). The spatial frequency component transformed by the DCT is divided by quantizing matrix and Huffman coding is performed for a part of an integer of the divided component and thereby the compressed image is given. According to JPEG, when the spatial frequency component is divided by using the quantizing matrix, high frequency component is mainly high-compressed. In addition, a direct current (abbreviated as "DC") component on an upper left end of matrix of the spatial frequency component is compressed by performing Huffman coding which is a lossless entropy compression method and other components are picked out diagonally and zigzag and are similarly compressed by performing Huffman coding.

JPEG as mentioned above uses a quantizing table by which higher compression is performed for higher frequency component by means of the fact that a human's eye is obtuse for high frequency component. The spatial frequency component is divided by the quantizing matrix and integer approximation is applied to the divided component and thereby information of the original image is lost Consequently, when the image is decoded by performing an inverse processing for encoding processing, the high frequency component is especially lost in a reproduced image. Thus, JPEG is a lossy method for encoding the image in which performing inverse transformation of the compressed image leads to production of a different image from the original image.

As mentioned above, JPEG is a lossy method for encoding the image and therefore, as to an image having steep variation of density of a character or the like, deterioration of quality of the image becomes serious. Consequently, as to an image given by performing processing for encoding an image including an edge such as a character or the like and then performing processing for decoding the image again, a hazy part, so-called mosquito noise, occurs on the image. The mosquito noise does not occur at the time of performing modified Huffman coding and modified Reed coding to be performed as a method for compressing the image in a monochrome facsimile, but the mosquito noise occurs mainly on a white base around the character at the time of performing JPEG and thereby dignity of the character is decreased significantly.

Figures 7A, 7B:
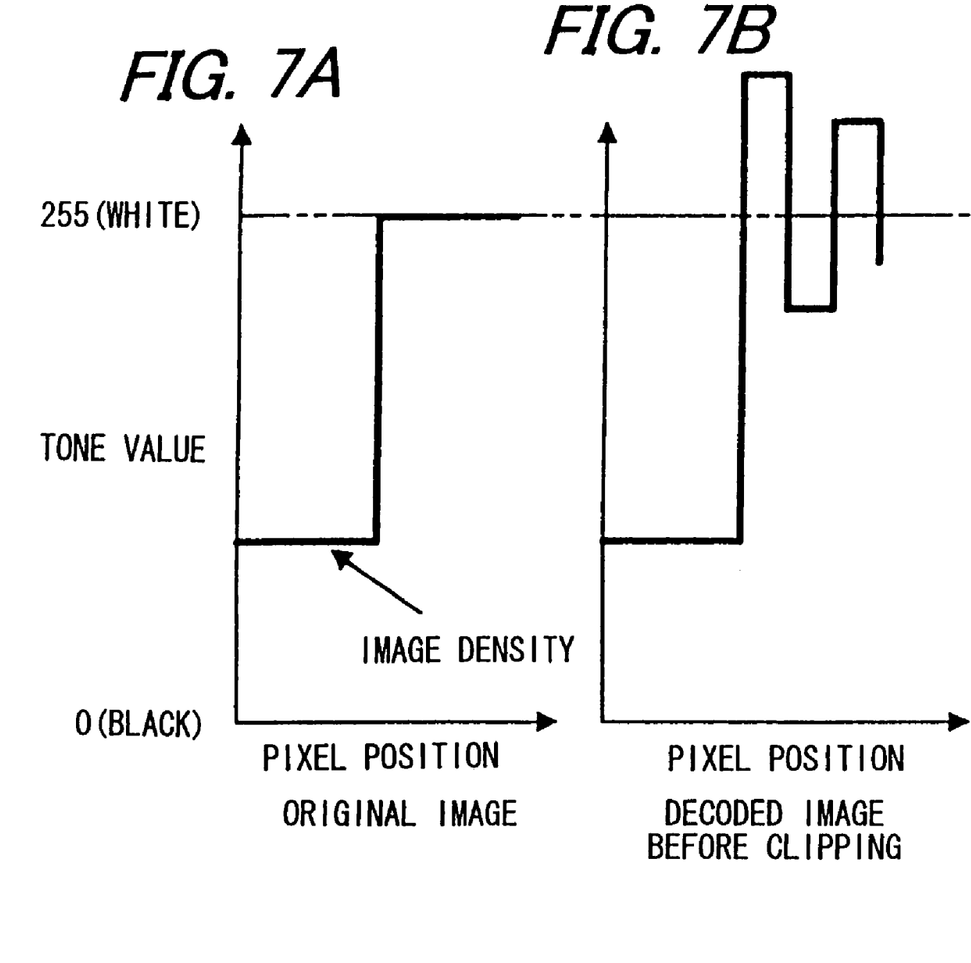
FIGS. 7A to 7C are views describing mosquito noise occurring by an image encoding method.
Figure 7C:
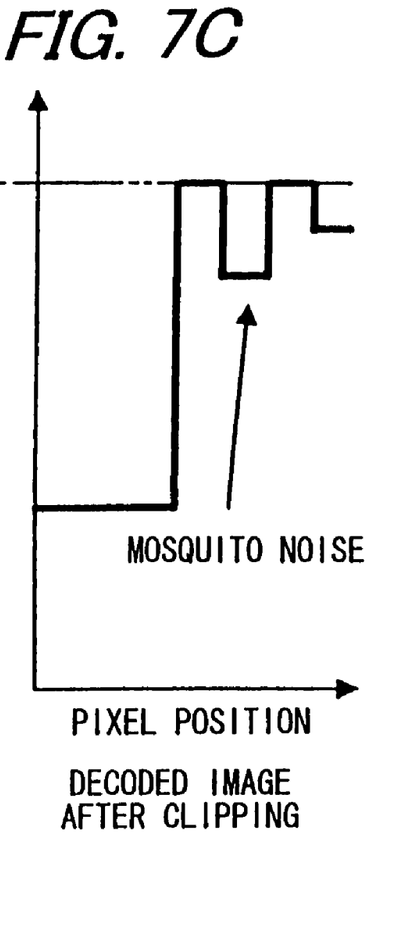

FIGS. 7A, 7B and 7C are views concretely describing occurrence of mosquito noise. In FIGS. 7A, 7B and 7C, a vertical axis denotes a color of each component at each color spatial coordinates on 256 tone value levels [from 0 (black) to 255 (white)] and a horizontal axis denotes one-dimensional pixel position. Here, only component L* which is lightness component sensitively seen by a human's eye is shown in consideration of a case of a standard color facsimile apparatus using the L*a*b* space. A color image is generally represented by three color components such as RGB or the like and each component is quantized to components on N steps within the extent from 0 to N−1. (N: A natural number equal to or more than 2) The greater the N is set, the more representation of the image becomes faithful to the original image, but when the image is processed by electronic equipment such as a computer or the like, N equal to 256 corresponding to the image represented by 8 bits is often selected.

Here, encoding is performed for an image whose left side is a character area and has high density and whose right side is a white margin area, in other words, for an image whose tone value is small on the left side of the pixel position or namely whose density is high and whose tone value is equal to 255 on the right side of the pixel position or namely whose density is low as shown in FIG. 7A. The image shown in FIG. 7A is encoded by JPEG and the encoded image is retransformed to be reproduced by performing inverse processing for the processing for encoding the image and the reproduced image is shown in FIG. 7B. FIG. 7B is a view showing a decoded image prior to clipping the image at the tone value equal to 255. Since high frequency component is high-compressed by encoding the image in the case of JPEG, the decoded image prior to clipping the image has a left image like a ripple on a white part of the decoded image and there is occurrence of a pixel whose tone value becomes a value equal to or more than 255. Therefore, in inverse transformation processing, a pixel outside of an extent of the tone value equal to or more than 255 is processed by clipping and the tone value is fixed to 255 as shown in FIG. 7C. As described above, since high frequency component is high-compressed in the conventional method for encoding the image, ripple density difference occurs in a part including high frequency component such as a character or the like. This ripple density difference causes the mosquito noise. In addition, similar ripple density difference also occurs in a black part which is a character area of the decoded image, but the similar ripple density difference is not practically so conspicuous and therefore, explanation about the similar ripple density difference is omitted in order to be simplified.

To reduce the above-mentioned mosquito noise, a value of the quantizing matrix should be made small. However, when the value of the quantizing matrix is made small, a compression ratio becomes small and therefore, for instance there is a problem that sending time becomes long in the color facsimile. Equipment such as many conventional color facsimile apparatus or the like is equipped with only JPEG as a method for encoding a color image and encodes a character to be used for representing an addresser or the like by JPEG and therefore, there is a problem that noise in the character area is conspicuous.

In addition, in the case of JPEG-2000, an image is not divided into a block and encoded by using wavelet transformation. However, the mosquito noise similarly occurs in this case.

The method for reducing occurrence of the above-mentioned mosquito noise is disclosed for instance in Japanese unexamined patent publications JP-A 6-86328 (1994), JP-A 7-50849 (1995), JP-A 11-308463 (1999), JP-A 2000-307879 (2000) and JP-A 2001-16452 (2001).

JP-A 6-86328 discloses an image decoding apparatus for removing the mosquito noise of a color difference signal generated by decoding high-compressed image data on the basis of a brightness signal In addition, in JP-A 7-50849, to enable a beautiful character to be displayed even when compression/expansion processing of image information is applied to an image resulting from synthesizing characters, a noise reduction portion is provided between an image memory and an image compression/expansion portion and prior to inputting the image resulting from synthesizing characters from the image memory to the image compression/expansion portion, a pixel having a halftone color between a character tone and a tone around the character is inserted as a first positioned pixel in horizontal and vertical directions on the outside of the synthesized characters.

In addition, in JP-A 11-308463, on the occasion of compression of image data in which a tone image such as a natural image or the like is mixed with a non-tone image such as characters or graphics or the like, the tone image and the non-tone image are encoded by using a different method for encoding each of the images respectively.

In addition, in JP-A 2000-307879, to reduce the mosquito noise, an image area of a mixed image is judged by a judging circuit for a brightness signal from among color component signals and the natural image is quantized by a quantizing table a and a binary image data is quantized by using a quantizing table b (a<b) and is sent and on a receiving side, asymmetric inverse quantizing is performed for the binary image data by using the same reference value as used in the quantizing table a and a part sticking out from a dynamic range of the brightness is clamped by the clamping circuit.

In addition, in JP-A 2000-16452, the mosquito noise is reduced by providing first base removal processing and second base removal processing respectively before and after the compression/expansion processing for the image data.

On the other hand, the color facsimile apparatus has MRC (Mixed Raster Content) as an optional method for encoding the image except JPEG which is a standard method for encoding the image. Only part of information about the addresser can be sent in a lossless method for encoding the image without any occurrence of noise by using the MRC. MRC divides the image into three layers composed of a fore layer, a mask layer and a back layer and encodes each of the three layers in different methods respectively. The fore layer and the back layer are color images and the mask layer is a binary image and plays a role of a switch for displaying either the fore layer or the back layer on a decoder of the image. The fore layer and the back layer are encoded by using the method for encoding the standard color image of the color facsimile such as JPEG or the like. The method for encoding the standard color image has lossless and lossy methods, but the mask layer uses the lossless method for encoding the standard binary image of the monochrome facsimile.

There is a method utilizing a transmission color as a method for overlapping two images each other except MRC which the color facsimile apparatus has. This method can be used for synthesizing a facial portrait and a frame, or an object and a background or the like. Specifying the transmission color can be performed by each pixel, but when lossy method for encoding the image such as JPEG is applied, the tone value of the pixel is changed and noise is inserted in an extent of the specified transmission color and therefore, lossless encoding such as GIF (Graphics Interchange Format) or PNG (Portable Network Graphic) or the like is used on WWW browser for the internet.

In addition, MPEG (Motion Picture Coding Experts) 4 which is a method for encoding a moving image has a function for encoding an arbitrary shape image, but to specify a part which is not displayed on specifying the shape, an image which is called alpha plane is used except the image to be displayed. The alpha plane includes binary alpha plane and grayscale alpha plane of the binary image. The grayscale alpha plane is used for specifying translucence optionally and lossy encoding is applied to the grayscale alpha plane and lossless encoding is essentially applied to the binary scale alpha plane.

In the image encoding methods disclosed in JP-A 6-86328 and JP-A 7-50849, when an compressed image is decoded, noise is eliminated. However, since complicated processing is required for judging whether the noise really occurs, decrease of a speed of decoding and increase of cost due to increase of a scale of a circuit cannot be avoided. In addition, in the image encoding method disclosed in JP-A 2000-307879, as to binary image data, quantizing the image data on the sending side and inverse quantizing the image data on the receiving side are performed asymmetrically and therefore, a plurality of quantizing tables is required. In addition, in the image encoding method disclosed in JP-A 2001-16452, processing for eliminating a base is separately performed before compression of the image and after decompression of the image and thereby mosquito noise is reduced, but there is a problem that an apparatus for performing the processing for eliminating the base is required on the sides of compression and decompression, respectively.

In addition, in the prior art, to prevent noise from occurring by performing encoding, lossless encoding is applied to a part in which occurrence of the noise is not desired, even for a white part of the base of the addresser and the transmission color. However, lossless encoding such as PNG or GIF or the like has defect of lower compression ratio in comparison with lossy encoding. In addition, in JP-A 11-308463, since two or more methods for encoding the image are used on encoding three layers for MRC and encoding an arbitrary shape for MPEG4, there is a problem in no compatibility with application to which one conventional method for encoding the image has been applied.

DISCLOSURE OF INVENTION

An object of the invention is to provide an image encoding method and an image apparatus which do not request change on a decoder and can give effects on many applications by having an encoder carry processing for reducing occurrence of mosquito noise.

The invention provides an image encoding method in which a color component is transformed to a spatial frequency area and an amount of information about image data is compressed, comprising:

a color transformation processing for changing at least one of color representing values of the colors belonging to two clusters corresponding to two areas represented in a color space to a color representing value in a direction of separating the two clusters.

According to the invention, when the two areas are represented in the color space, at least either a cluster which is collection of pixels in one area represented in the color space or a cluster which is collection of pixels in another area represented in the color space is changed so that the color representing value of pixel in each of the areas is changed in the direction of separating the two clusters and then the color component is transformed to the spatial frequency area and compressing an amount of information by the entropy compression method enables mosquito noise occurring on an image at the time of decoding the image by data lost at the time of compression of the amount of the information to be reduced.

In addition, the invention is characterized in that the color transformation processing is applied to a character area in which a character exists.

According to the invention, since the color transformation processing is applied to a character area in which a character with high possibility of occurrence of mosquito noise, the mosquito noise can be efficiently reduced. In addition, when the color transformation processing is performed for only the area in which the character exists, processing for encoding the image can be efficiently performed.

In addition, the invention is characterized by further comprising a color transformation processing for changing a color representing value of a pixel corresponding to white to an inverse direction for the direction of black.

According to the invention, after color transformation processing is performed for changing the tone value which is the color representing value of the pixel corresponding to white to the inverse direction for the direction of black, for instance, the tone of the original image is defined as N tone within the extent from 0 to N−1 (N: A natural number equal to or more than 2) and a side of a larger number is defined as a side of white and all the tone values of the pixels corresponding to white are defined as a larger value than N−1 and then the a color component is transformed to the spatial frequency area and an amount of information is compressed by the entropy compression method and therefore, this compression enables mosquito noise occurring in a white part of the image at the time of decoding the image by data lost at the time of compression of the amount of the information to be reduced.

In addition, the invention is characterized by further comprising a color transformation processing for changing a color representing value of a pixel corresponding to black to an inverse direction for the direction of white.

According to the invention, after color transformation processing is performed for changing the tone value which is the color representing value of the pixel corresponding to black to the inverse direction for the direction of white, for instance, the tone of the original image is defined as N tone within the extent from 0 to N−1 (N: A natural number equal to or more than 2) and a side of a larger number is defined as a side of white and all the tone values of the pixels corresponding to black are defined as a smaller value than 0 and then the color component is transformed to the spatial frequency area and an amount of information is compressed by the entropy compression method and therefore, this compression enables mosquito noise occurring in a black part of the image at the time of decoding the image by data lost at the time of compression of the amount of the information to be reduced.

In addition, the invention is characterized by further comprising a color transformation processing for changing color representing values of colors belonging to two clusters corresponding to a character area and a background area represented in a color space to color representing values in a direction of separating the two clusters.

According to the invention, when the character area and the background area are represented in the color space, the cluster which is a collection of pixels in the character area and the cluster which is a collection of pixels in the background area respectively represented in the color space area are changed to a direction of separating the two clusters and then the color component is transformed to the spatial frequency area and an amount of information is compressed by the entropy compression method and therefore, this compression enables mosquito noise occurring in the image at the time of decoding the image by data lost at the time of compression of the amount of the information to be reduced.

In addition, the invention is characterized in that the color transformation processing is performed when image data which adds characters to input image is encoded.

According to the invention, the color transformation processing is performed at the time of encoding image data with characters used for a date, a comment, a calendar or the like added to an image input from for instance a record of the addresser in a facsimile apparatus and the memory and an imaging apparatus or the like and therefore, even when a character is written in the image later, mosquito noise can be reduced.

In addition, the invention is characterized in that the color transformation processing is performed for a specified part when image data having the part specified as a character area is encoded.

According to the invention, when image data having a part specified as a character area, for instance, an image data represented on the basis of markup language specifying a character file and a image file is encoded, the color transformation processing is for the specified part and therefore, the character area can be easily identified and efficient processing can be performed for the character area with high possibility of occurrence of mosquito noise.

In addition, the invention is characterized in that an area is divided into an image area and a character area and the color transformation processing is performed for an area judged as the character area.

According to the invention, an area is divided into an image area and a character area and performing the color transformation processing for the divided character area enables efficient processing to be performed.

In addition, the invention is characterized in that a character area can be specified by a user.

According to the invention, a user's specifying the character area enables a place for which the color transformation processing is performed to be specified and also enables efficient processing to be performed.

In addition, the invention is characterized in that a color representing value of each pixel is judged as being corresponding to white and the color transformation processing is performed when the color representing value of each pixel is equal to or less than a previously set density.

According to the invention, when the color representing value of each pixel is equal to or less than the previously set density, the color representing value is judged as being a pixel color representing value corresponding to white and the color transformation processing is performed and therefore, the pixel corresponding to white can be defined and the color transformation processing can be also performed for an image in which the whitest color does not exist on color representation.

In addition, the invention is characterized in that a color representing value of each pixel is judged as being corresponding to black and the color transformation processing is performed when the color representing value of each pixel is equal to or more than a previously set density.

According to the invention, when the color representing value of each pixel is equal to or more than the previously set density, the color representing value is judged as being a pixel color representing value corresponding to black and the color transformation processing is performed and therefore, the pixel corresponding to white can be defined and the color transformation processing can be performed for an image in which the blackest color does not exist on color representation.

In addition, the invention is characterized in that distribution of lightness of an image to which the color transformation processing is applied is obtained and a part of each pixel having lightness within an extent from a maximum lightness of the distribution to lightness added by a predetermined value or a part having lightness with a rate equal to or more than a predetermined rate within an extent between the maximum lightness and a minimum lightness is judged as being a color representing value corresponding to white.

According to the invention, distribution of lightness of the image to which the color transformation processing is applied is obtained and a part of each pixel having lightness within an extent from a maximum lightness of the distribution to lightness added by a predetermined value or a part having lightness with a rate equal to or more than a predetermined rate within an extent between the maximum lightness and a minimum lightness is judged as being a color representing value corresponding to white and therefore, the color transformation processing can be performed even for an image in which the whitest color does not exist on color representation.

In addition, the invention is characterized in that distribution of lightness of an image to which the color transformation processing is applied is obtained and a part of each pixel having lightness within an extent from a maximum lightness of the distribution to lightness subtracted by a predetermined value or a part having lightness with a rate equal to or less than a predetermined rate within an extent between the maximum lightness and the minimum lightness is judged as being a color representing value corresponding to black.

According to the invention, distribution of lightness of the image to which the color transformation processing is applied is obtained and a part of each pixel having lightness within an extent from the minimum lightness of the distribution to lightness subtracted by a predetermined value or a part having lightness with a rate equal to or less than a predetermined rate within an extent between the maximum lightness and a minimum lightness is judged as being a color representing value corresponding to black and therefore, the color transformation processing can be performed even for an image in which the blackest color does not exist on color representation.

In addition, the invention is characterized in that a color representing value of a pixel corresponding to white is transformed to a value which is obtained by changing a value corresponding to the whitest color on color representation with only a predetermined value in an inverse direction for the direction of black.

According to the invention, the color representing value of the pixel corresponding to white is transformed to the value which is obtained by changing the value corresponding to the whitest color on color representation with only the predetermined value in an inverse direction for the direction of black and therefore, adjusting the predetermined value enables mosquito noise to be efficiently reduced.

In addition, the invention is characterized in that a color representing value of a pixel corresponding to black is transformed to a value which is obtained by changing a value corresponding to the blackest color on color representation with only a predetermined value in an inverse direction for the direction of white.

According to the invention, the color representing value of the pixel corresponding to black is transformed to the value which is obtained by changing the value corresponding to the whitest color on color representation with only the predetermined value in an inverse direction for the direction of white and therefore, adjusting the predetermined value enables mosquito noise to be efficiently reduced.

In addition, the invention is characterized in that the closer to the whitest color on color representation a color representing value of a pixel corresponding to white is, the more the color representing value is changed to a value in an inverse direction for the direction of black.

According to the invention, the closer to the whitest color on color representation the color representing value of the pixel corresponding to white is, the further the color representing value is changed to a value in the inverse direction for the direction of black and therefore, mosquito noise can be efficiently reduced.

In addition, the invention is characterized in that the closer to the blackest color on color representation a color representing value of a pixel corresponding to black is, the more the color representing value is changed to a value in an inverse direction for the direction of white.

According to the invention, the closer to the blackest color on color representation the color representing value of the pixel corresponding to black is, the further the color representing value is changed to a value in the inverse direction for the direction of white and therefore, mosquito noise can be efficiently reduced.

In addition, the invention is characterized in that a color representing value is changed on the basis of a value obtained by multiplying a constant coefficient by difference between a minimum density value and a maximum density value of an image on the color transformation processing.

According to the invention, the color transformation processing is performed on the basis of the value obtained by multiplying the constant coefficient by difference between the minimum density value and the maximum density value of the image and therefore, adjusting the coefficient enables mosquito noise to be efficiently reduced.

In addition, the invention is characterized in that when the original image is compared with an image reproduced by performing inverse transformation of the image encoded by the method for encoding the image and color difference between the both images is equal to or more than a predetermined color difference, the constant coefficient is changed until the color difference between the both images fits in an extent of the predetermined color difference.

According to the invention, when the original image is compared with an image reproduced by performing inverse transformation of the image after the image was compressed once and color difference between the both images is equal to or more than a predetermined color difference, the constant coefficient is changed until the color difference between the both images fits in the extent of the predetermined color difference and therefore, mosquito noise can be surely reduced.

In addition, the invention is characterized in that a warning is given to a user when the color difference between the reproduced image and the original image does not fall in the extent of the predetermined color difference in spite of changing the constant coefficient at predetermined number of times.

According to the invention, since a warning is given to a user when the color difference between the image decoded after encoding the image and the original image does not fit in the extent of the predetermined color difference in spite of changing the constant coefficient at predetermined number of times, the user is coped with an image on which much mosquito noise occurs.

In addition, the invention is characterized in that an image reproduced by performing inverse transformation for an image encoded by using a method for encoding the image is displayed.

According to the invention, an image reproduced by performing inverse transformation for the image encoded is displayed by a display apparatus and a printing apparatus or the like and thereby the image can be confirmed and decision of succeeding processing can be performed.

In addition, the invention is characterized in that the user can set whether the color transformation processing is performed.

According to the invention, whether the color transformation processing is performed can be set by the user and therefore, performing the color transformation processing is set so that the color transformation processing is not performed for an image not including an edge such as a character and the color transformation processing is performed only for an image including an edge such as a character and, thereby processing for encoding an image can be efficiently performed.

In addition, the invention provides an image apparatus using the above-mentioned method for encoding the image.

According to the invention, the image apparatus is realized by, for example, a communicating apparatus which handles the image realized as a facsimile apparatus, an information processing apparatus realized as a personal computer, and a graphic apparatus realized as a digital camera, and it is possible to generate an image with reduced mosquito noise when an image encoded by an image apparatus is decoded.

BRIEF DESCRIPTION OF DRAWINGS

The object, features and advantages of the invention will be more clarified by the following detailed explanation and drawings.

BEST MODE FOR CARRYING OUT THE INVENTION

The following description will describe in detail preferred embodiments of the invention with reference to the accompanying drawings.

The invention is effective in all the image apparatuses using all the image encoding methods by which a color image or a grayscale image is transformed to the spatial frequency area and the entropy compression method is performed, but in the embodiment, a color facsimile apparatus is exemplified and described.

Figure 1:
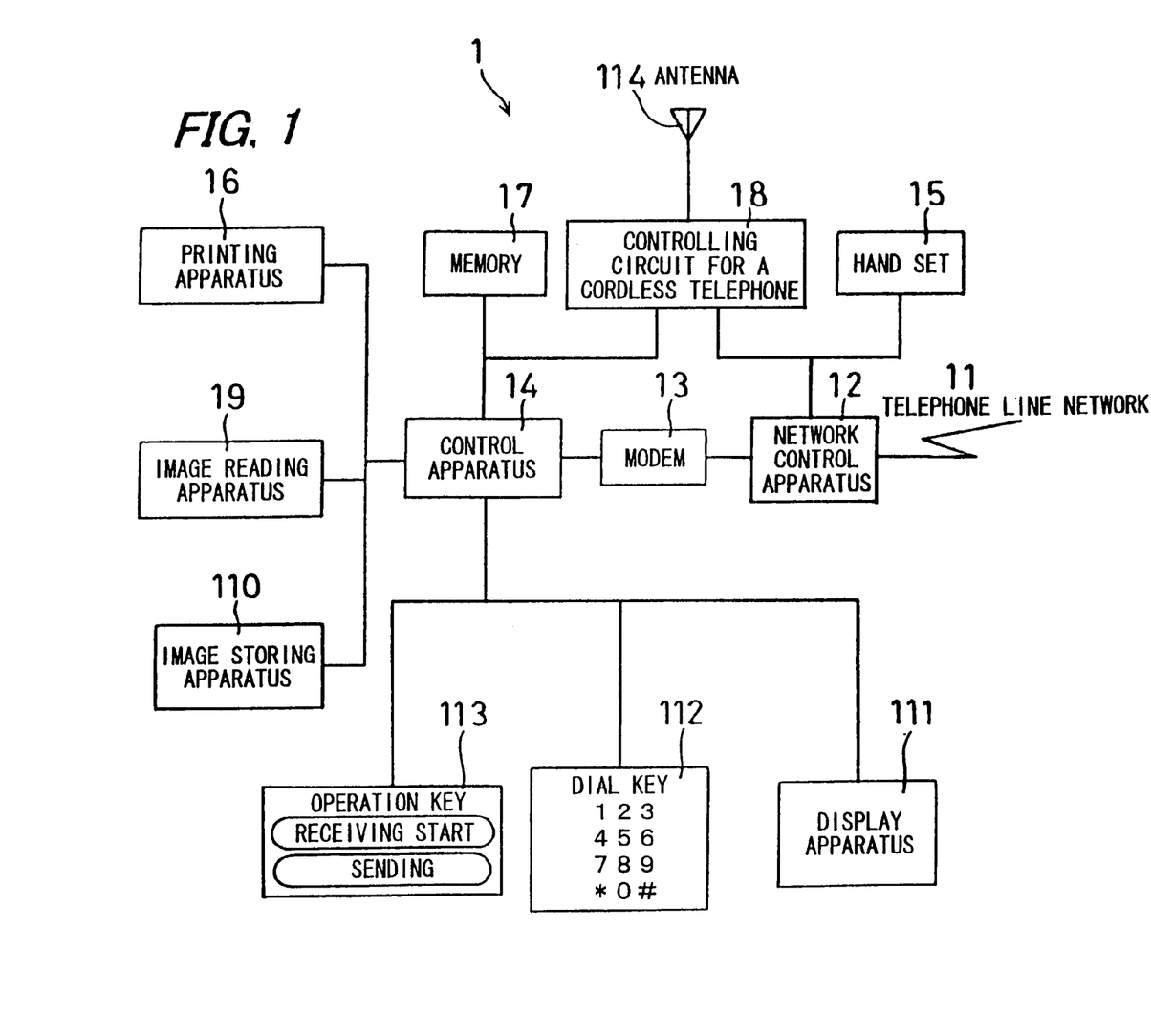
FIG. 1 is a block diagram showing configuration of a facsimile apparatus 1 which is one embodiment of the present invention.

FIG. 1 is a block diagram showing configuration of the facsimile apparatus 1 which is one embodiment of the present invention. The facsimile apparatus 1 has function of facsimile communication and function of telephone communication. The facsimile apparatus 1 in this embodiment comprises a network control apparatus 12, a modem 13, a control apparatus 14, a hand set 15, a printing apparatus 16, a memory 17, a control circuit for a cordless telephone 18, an image reading apparatus 19, an image storing apparatus 110, a display apparatus 111, a dial key 112, an operation key 113 and an antenna 114.

The facsimile apparatus 1 is connected to a telephone network 11 which is a public network via the network control apparatus 12 and can send/receive both a color image and a monochrome image through the telephone network 11.

Setting on the occasion of sending the color image or the monochrome image is performed by the operation key 113, but sending the color image can be performed only when equipment on the other end of a sending line has ability of receiving the color image. Consequently, even if sending the color image is specified with use of the operation key 113, sending the color image is automatically switched to sending the monochrome image in the case of the equipment on the other end of the sending line having only ability of receiving the monochrome image, The network control apparatus 12 performs monitoring the telephone network 11 and also switches and connects the telephone network 11 to the side of the hand set 15 and the control circuit for a cordless telephone 18 or the side of the modem 13. The modem 13 modulates a digital signal handled in the facsimile apparatus 1 to an analogue signal applicable to the telephone network 11 and also demodulates an analogue signal received from the telephone network 11 to a digital signal.

The control apparatus 14 comprises, for instance, a microprocessor or the like and determines operation of the whole of the control apparatus 14 by using input and information about instruction of a user given from the dial key 112 and the operation key 113, receipt from the telephone network 11 and a signal indicating condition given from each apparatus of the facsimile apparatus 1, correlatively with a program to be stored in the memory 17. In addition, the control apparatus 14 performs instruction of operation to each apparatus of the facsimile apparatus 1, sending a necessary signal to the telephone network 11 and instruction of displaying information and guidance or the like to display apparatus 111.

Furthermore, the control apparatus 14 performs compression and decompression of information. Image encoding methods such as MH (Modified Huffman) and MR (Modified Read) or the like are used for compression and decompression of the information of the monochrome image. After-mentioned image encoding method is used for compression and decompression of the information of the color image. In addition, the control apparatus 14 has function for mutually transforming color images such as a color image represented by additive three primary colors composed of red (R), green (G) and blue (B) to be used at the time of reading the image, a color image represented by subtractive three primary colors composed of cyan (C), magenta (M), and yellow (Y) and a color image represented by L*a*b* color spatial coordinate (color space) to be used at the time of sending/receiving the image in a facsimile. However, when the control apparatus 14 is extremely overloaded by holding function for handling these color images, in other words function for performing compression and decompression of the images, a unit having the function for handling these color images may be separately provided.

The dial key 112 and the operation key 113 comprise a ten-key pad and a keyboard for input or the like and are used when the user inputs information.

An image storing apparatus 110 is an apparatus storing an image received via the telephone network 11 and an image read by the image reading apparatus 19 or the like. Installation of this image storing apparatus 110 enables the facsimile apparatus 1 to have advanced function for transferring and broadcasting an image, substitutional receiving under paper out condition and memory sending.

The printing apparatus 16 adopts printing mechanism applicable to color image printing such as a color ink-jet printer, a color electrophotographic printer, and a color thermal transfer printer or the like in order to print the color image. There are following two systems as the mechanism applicable to color image printing. One is a system in which three primary colors of each pixel have a multistep tone as adopted in a silver film of a photograph and a sublimatic color thermal transfer printer or the like and another is a system in which each color can represent only two tones composed of a tone with a dot and a tone without any dot as adopted in normal inkjet system. When a half tone is represented with use of the latter two tones, a half tone representing method such as a dither method, an error diffusion method or the like is utilized. When the number of dots of a printer is more than the number of dots of a received image, first, density of three primary colors (C, M, Y) of each color of the received image is determined by interpolation so as to be adapted to resolution of the printer and then one of binary values, in other words, with the meaning of printing or non-printing, is determined at every printing dot by using technique for the half tone at every primary color on the basis of the resolution of the printer.

The control circuit for a cordless telephone 18 and the antenna 114 are used at the time of performing telephone communication by using a cordless telephone, in other words, a handset.

image reading apparatus 19 uses a method of reading an image by sequentially turning on light sources of three colors (R, G, B) such as LED (Light Emitting Diode) and a fluorescent light or the like to be used for reading color images at every a reading line and also uses a method of reading an image by using a photoelectric transfer sensor such as CCD (Charge Coupled Device) for three colors (R, G, B) respectively provided with a color filter for the three colors.

For the display apparatus 111, a several-line LCD (Liquid Crystal Display) for performing simple guidance is used for a simple facsimile, but a color LCD having a wide display area is used for the facsimile of the embodiment of the invention because it is desirable that a color image is displayed.

Next, description is given about the image encoding method to be used at the time of compressing the image in the facsimile apparatus.

Figure 2:
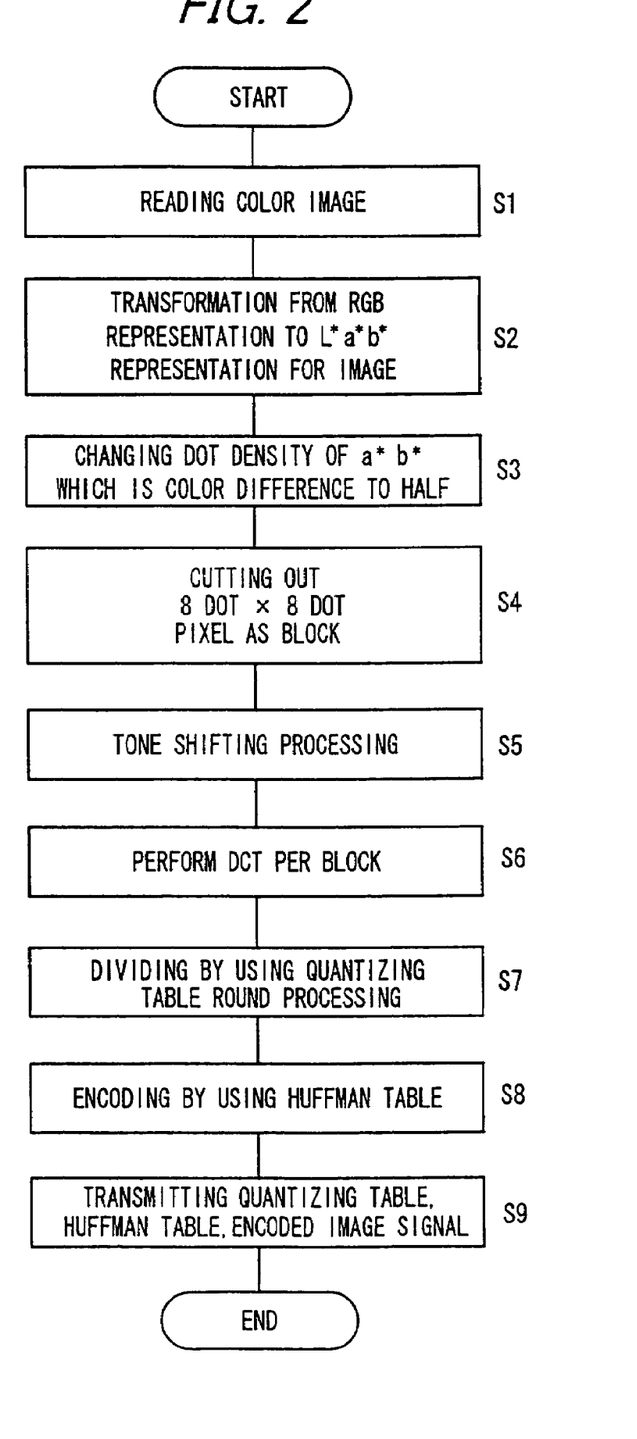
FIG. 2 is a flowchart showing operation of processing for encoding an image in the facsimile apparatus 1.

FIG. 2 is a flowchart showing procedure for encoding an image in the facsimile apparatus 1. When the color image is sent, there are combinations of many options and referring to all the combinations cannot be performed and therefore, only the most standard procedure is shown in FIG. 2. However, effectiveness of the invention is not changed for many options.

When the color image is sent by facsimile, first, the image is read by using the image reading apparatus 19 at a step S1. Since the color image is normally represented by the color coordinates of R, G, and B, the color image is read in by 8-bit half tone of each color in the size of 200 dpi (dot per inch)×200 dpi and the read image is stored in the image storing apparatus 110. And then the step S1 proceeds to a step S2 and the image which is stored in the image storing apparatus 110 and is represented by the color coordinates of R, G, and B is transformed to representation given by L*a*b* space which is space for a standard color to send by the control apparatus 14 and the memory apparatus and the step S2 proceeds to a step S3. At step S3, resolution of brightness component L* is kept as it is and resolution of the first color difference component a* and the second color difference component b* is compressed to a half of the resolution for both main scanning direction and sub scanning direction, in other words, dot density is changed to a half of the dot density and the step S3 proceeds to a step S4. At a step S4, brightness component L* and color difference components a* and b* are cut out per component by every 8 dots in the main scanning direction and sub scanning direction and the step S4 proceeds to S5. At the step S5, tone shifting processing which is color transformation processing characterized in the invention is performed. This tone shifting processing is applied to a character area in which a character of an addresser record or the like exists. Here, the tone value of each block cut out at the step S4 is changed. Detailed description about tone shifting processing is mentioned later. Next, the step S5 proceeds to S6 and DCT (Discrete Cosine Transform) is performed for the block for which tone shifting processing is performed at the step S5 as a unit and the block is transformed to representation on two-dimensional frequency distribution matrix which is an spatial frequency area and the step S6 proceeds to S7. At the step S7, the two-dimensional frequency distribution matrix transformed at the step S6 is divided by using the quantizing table and rounding processing is performed and the step S7 proceeds to S8. In the image encoding method of the invention, compression rate of the image is changed depending on the value of the quantizing table used at the step S7 as similarly as JPEG. Here, adopting high compression rate enables high speed sending the image to be performed, but deterioration of quality of the image becomes great. On the contrary, lowering the compression rate makes deterioration of quality of the image less, but sending speed becomes low because an amount of information to be sent is increased.

Next, at the step S8, two dimensional frequency distribution matrix of the image which is subtracted by the quantizing and is rounded in the above-mentioned S7 is changed to the actual compressed encoded data by the Huffman table and the encoded data is sent to a receiving side with the quantized data and the Huffman table.

As mentioned above, the image encoding method of the facsimile 1 comprises the tone shifting processing, but is nearly equal to the image encoding method of JPEG and therefore, the image compressed by the facsimile apparatus 1 can be decoded by a conventional facsimile or the like which handles JPEG. Consequently, at a communication apparatus in which the image is received, the image is fetched according to normal procedure for decoding JPEG, in other words, procedure for proceeding in an inverse direction in a state where the step S5 is omitted on the flowchart in FIG. 2. In addition, the image received in the facsimile apparatus 1 is transformed to the CMY colors' coordinates applicable to the printing apparatus 16 and is printed. However, since there are many cases in which black cannot be sufficiently reproduced in spite of mixing CMY colors with each other, printing may be performed by adding black K to three colors of CMY.

Next, detailed description is given about the tone shifting processing. There is little importance of the color difference components a* and b* and the brightness component L* mainly plays an important role in the color image. This is because the tone shifting processing is described by only using the brightness component L* in the embodiment of the invention.

In addition, when a black character is written on a base which is a white background area, mosquito noise mainly occurs in black on the white base around the black character, but inversely when a white character exists on a base which is a black background area, mosquito noise occurs in white on the black base around the white character. When the white character of the image exists on the black base and black and white reversal of the image is performed and the reversed image is displayed and printed, after all there is the similar occurrence of mosquito noise as the case of existence of the black character on the white base and therefore, the white mosquito noise on the black base is also equally handled. However, since most of description about a case of existence of an outline character on the black base can be directly adapted to the invention by inversing contrast of the brightness with exchange of white and black in the description in the case of existence of the black character on the white base, in the embodiment of the invention description is given about only the case in which the black character is written on the white base.

FIGS. 3A, 3B, 3C and 3D are a view for describing the tone shifting processing. In graphs of FIGS. 3A, 3B, 3C and 3D, the vertical axis represents the tone value which is the color representing value and represents one of the brightness component L* and the color difference components a* and b* by using 256 levels of tone values from 0 for black to 255 for white. Here, the vertical axis of graphs of FIGS. 3A, 3B, 3C and 3D represents the tone value of the brightness component L* as mentioned above and the horizontal axis of the graphs represents a one-dimensional position of the pixel. As the original image in the embodiment of the invention, the left side of the image has high density at a character portion 300 as shown in the FIG. 3A and description is given about encoding processing for an image 301 whose right side is a margin and white. In addition, in the embodiment of the invention, description is given about a case in which tone shifting processing is applied to a white pixel having the tone value corresponding to white color of the image, in other words the tone value 255 in FIG. 3.

Figures 3A, 3B:
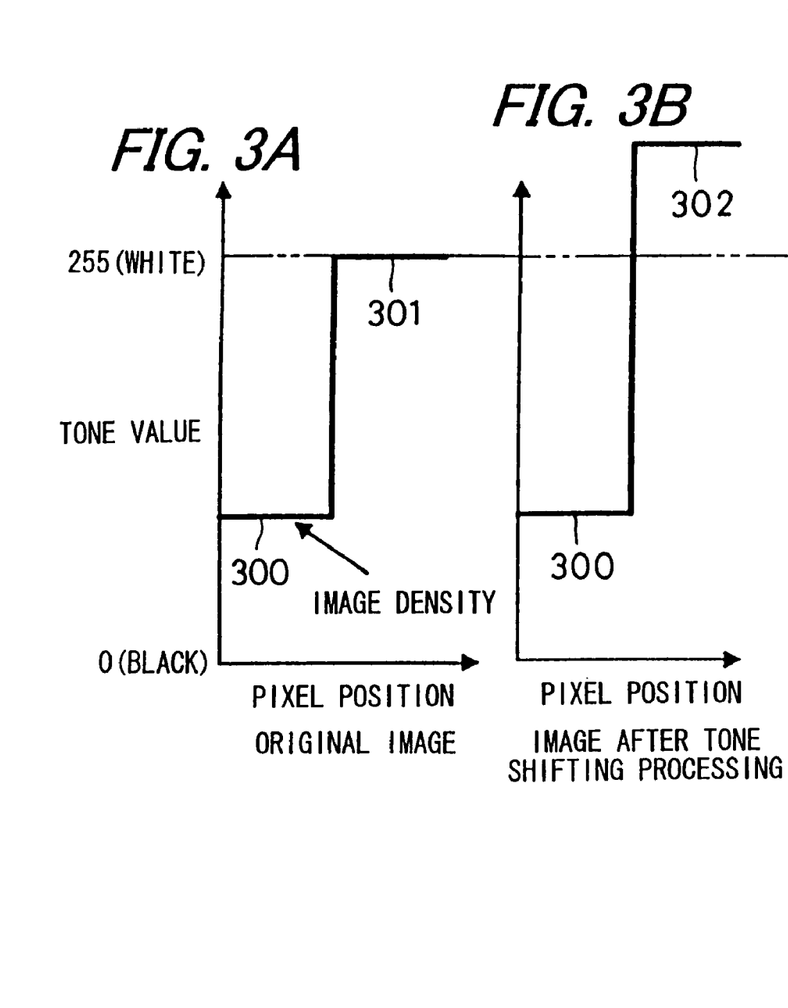
FIG. 3A is a view showing a tone value of an original image.
FIG. 3B is a view showing a tone value of an image for which tone shifting processing is performed.
Figure 3C:
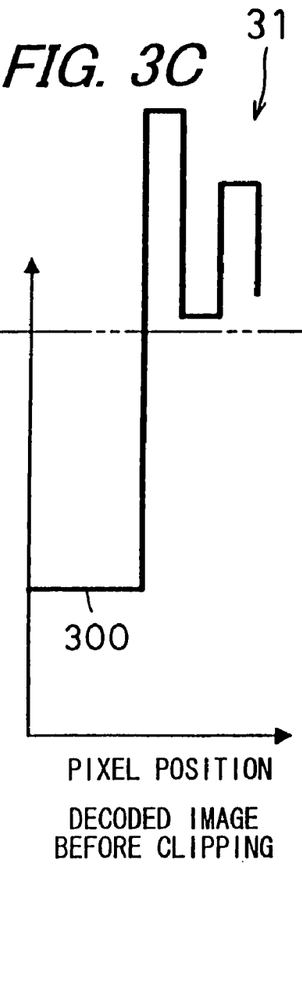
FIG. 3C is a view showing a tone value of an image for which tone shifting processing is performed and which is encoded and decoded prior to clipping.
Figure 3D:
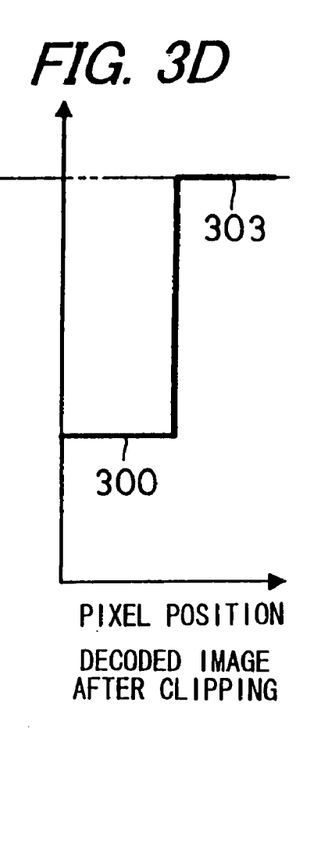
FIG. 3D is a view showing a tone value of an image produced by performing clipping for the image in FIG. 3C.

The tone shifting processing changes the tone value of the pixel which has the tone value equal to 255 in FIG. 3A and corresponds to white to a tone value which is outside of the extent of the tone value in an opposite direction to the black side by the control apparatus 14 and the memory 17 as shown as a referential code 302 in FIG. 3B. In other words, the tone value of the pixel is made a further larger value than the value 255 corresponding to the whitest value. The image to which this tone shifting processing is applied is encoded according to the procedure shown in FIG. 2 and when the encoded image is decoded, as to the tone value of the same part of the image, a ripple 31 which has a larger value than the tone value 255 occurs on a white part of the image as shown in FIG. 3C. FIG. 3C is a view showing the decoded image existing prior to clipping. This ripple 31 occurs because of high frequency component high-compressed by encoding the image. However, as shown in FIG. 3C, an abnormal condition of the image in a shape of ripple on the decoded image existing prior to clipping is centered in the pixel whose tone value is outside of the extent of the tone value with larger tone value than 255. Consequently, mosquito noise occurs in a part of the image including the pixel whose tone value is outside of the extent of the tone value with larger tone value than 255. Clipping is applied to this image at the tone value 255 and the image is shown in FIG. 3D. As shown in FIG. 3D, it turns out that mosquito noise occurring in the image (referred to FIG. 7C) encoded by the conventional image encoding method disappears by performing the tone shifting processing as shown in a referential code 303.

Since there is also a case in which the tone value of the pixel deviates from the extent of the tone value in the conventional image encoding method as shown in FIG. 7, clipping processing is essential for decoding the image. Consequently, Even when the conventional facsimile which performs encoding processing by conventional JPEG is used for a facsimile which performs decoding processing for the image encoded by performing the tone shifting processing on the occasion of compressing the image, mosquito noise can be reduced.

A similar ripple as the ripple 31 shown in FIG. 3C also occurs in the black part of the character of the decoded image, but the ripple is not practically distinguished so much and therefore, description of the ripple is omitted in order to provide briefness.

In addition, as mentioned above, this image encoding method can be applied to the black part of the image, but in this case, the tone value of the image which is 0 indicating black on the original image is changed in an opposite direction to the white side. In other words, the tone value of the pixel corresponding to the black may be changed to a minus value by performing the tone shifting processing.

In the embodiment of the invention, the above-mentioned tone shifting processing may be respectively performed for both of the white pixel and a black pixel.

In the above-mentioned color transformation processing, description is given about the case in which characters are represented in white and black, but there may be use of a method for representing the character area and the background area corresponding to a base part on which a character is written by using a color tone. When the character area and the background area are by using the color tone, there is often a case of selecting a color tone for the character area which can be identified as easily as possible for the background area and there is often a case of selecting a color related to a complementary color for the character area and the background area.

The following description is given about the color transformation processing in the case in which the method for representing the character area and the background area by a color tone is used.

Figure 4:
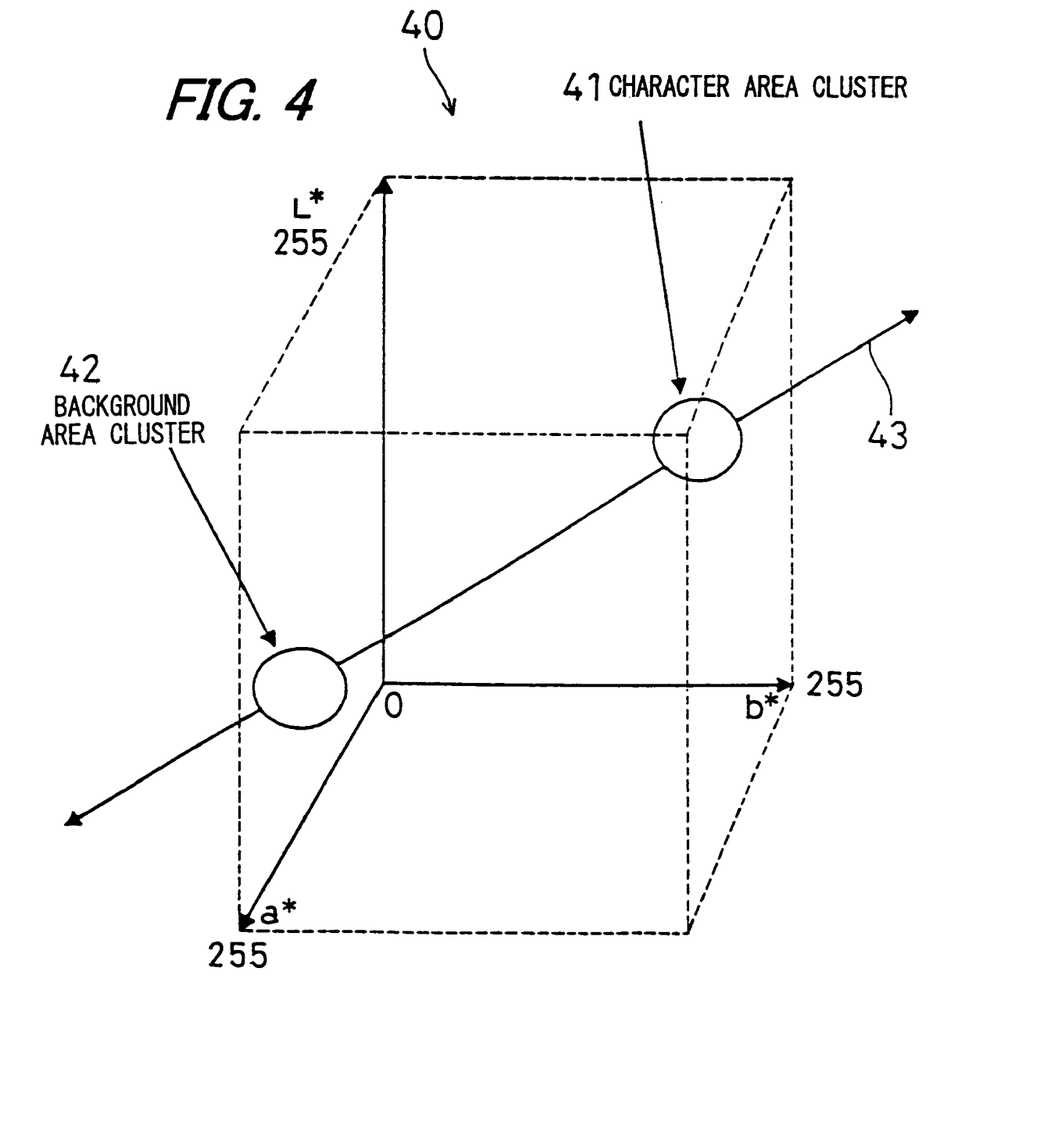
FIG. 4 is a view showing a character area cluster and a background area cluster in L*a*b* color space.

FIG. 4 is a view showing a character area cluster 41 and a background area cluster 42 in L*a*b* color space 40. In the L*a*b* color space 40 shown in FIG. 4, each component is represented by using 256 tone values from 0 to 255. The character area cluster 41 indicates collection of color tones of each pixel by which the character is configured and the background area cluster 42 indicates collection of color tones of each pixel by which the background area is configured. Consequently, as to the character area cluster 41 indicating the color tone of the character area and the background area cluster 42 indicating the color tone of the background area, a cluster which has further distance in the L*a*b* space can be easily identified.

As to the image sent by the facsimile apparatus 1, the character area and the background area forms one cluster respectively as shown in FIG. 4. When the tone of the character to be made is set in advance, for instance, in a case of making the character in the facsimile apparatus 1 by using the operation key 113 and the dial key 112 or the like, the character area cluster 41 becomes one point in the L*a*b* color space 40, but when the image including the character is read by the image reading apparatus 19 or the like, the character area cluster 41 has a shape which is scattered in a certain degree. Consequently, as to the character read by the image reading apparatus 19 or the like, two clusters corresponding to the character area cluster 41 and the background luster e42 are given.

Mosquito noise can be reduced by performing the color transformation processing which changes the color tones of the character area cluster 41 and the background area cluster 42 to the outside area of the L*a*b* color space 40, in other words to the outside area of the color space with which tone values of the brightness component L* and each color difference component a*, b* are 0 through 255 in the embodiment of the invention. A direction in which each cluster is shifted is a direction in which a straight line 43 combining each cluster of the character area cluster 41 and the background area cluster 42 is expanding and also a direction in which each cluster is estranged each other. In addition, the direction in which each cluster is shifted may be a direction of two clusters' components having the furthest estranged tone values, in other words, a direction of b* in which the character area cluster 41 and the background area cluster 42 have furthest estranged tone values in FIG. 4.

Above-mentioned characters represented in white and black can be also handled respectively as a black cluster and a white cluster in the color space and in this case, the characters can be applied to the color space on condition that the direction in which each cluster is shifted is the direction in which the straight line combining both clusters of the black cluster and the white cluster is expanding and also the direction in which the both clusters are estranged each other. In the embodiment of the invention, the color space is defined as a color space comprising the brightness component L and the two color difference components a*, b*, but is not limited to this color space and may be also a color space comprising red component R, green component G and blue component B.

In addition, as to the color transformation processing in the case in which the method for representing the character area and the background area by using the above-mentioned color tone is used, it is desirable that the color transformation method is mainly applied to the character area. When the above-mentioned color transformation processing is applied to a natural image, density of only a part of the image becomes deviated. However, since the above-mentioned color transformation processing is applied to only apparatus by which encoding processing is performed, applying the above-mentioned color transformation processing to a necessary part of the image never interferes with the side on which decoding processing is performed.

In the facsimile apparatus 1, the edge of the image is detected by analyzing the image and whether the edge is related to a natural image area or the character area is judged from the condition of the edge and the natural image area and the character area are divided and then the tone shifting processing may be applied to the character area. Since a method for dividing the natural image area and the character area by analyzing the image exists as well known art, using this art enables only the character area to be easily judged and efficient compression of the image to be performed.

In addition, in the facsimile apparatus 1, a user may specify the character area and thus the user specifies a character area in which mosquito noise is apt to occur and the color transformation processing is applied to the character area and thereby the facsimile apparatus 1 does not require detection of the character area and efficient compression of the image can be performed. In the embodiment of the invention, a method for specifying the character area is not defined, but various methods, for instance such as a method for inputting coordinates in the character area by using the operation key 113 and the dial key 112 or the like and a method for specifying the character area on the display apparatus 111 by using a pen or a mouse or the like, can be used.

In addition, when the character is made in the facsimile apparatus 1, 255 and 0 are set to the tone values of the white pixel and the black pixel respectively and therefore tone shifting processing can be performed for only pixels having these tone values. However, in the area which is judged as a character area by analyzing whether the image input from an external portion by the image reading apparatus 19 is related to the character area or the background area, the background area does not always have the tone value equal to 255 or there is a case in which the background area and the character area cannot be divided and thereby a tone value of each pixel of a pure white original image is not always equal to 255 even when the original image is read by the image reading apparatus 19. Consequently, there is necessity of definition of a white level as a value corresponding to white or a black level as a value corresponding to black concerning the color transformation processing. Definition of the white level or the black level may adopt a predetermined tone value as criterion of judgment such as judgment of the tone value equal to or less than a predetermined density (e.g., $0 \leq$ tone value $\leq 20$) as black and judgment of the tone value equal to or more than a predetermined density (e.g., $235 \leq$ tone value $\leq 255$) as white or the like.

In addition, in the definition of the white level or the black level, first an extent of brightness of the image is found and for instance, when the tone value of the original image is equal to or more than 30 and equal to or less than 200, a judging limit, for instance such as the extent of the tone value equal to 30 previously set, is set and the tone value equal to or more than 30 and equal to or less than 60 may be judged as black and the tone value equal to or more than 170 and equal to or less than 200 may be judged as white. In addition, as to the previously set tone, brightness within an extent equal to or more than a predetermined constant rate between maximum brightness and minimum brightness may be judged as white and brightness within an extent equal to or less than a predetermined constant rate between maximum brightness and minimum brightness may be judged as black.

In addition, brightness is shifted with only previously specified ratio for the extent of brightness of the original image from both ends of the extent of brightness and an area included in the extent of may be judged as white and black respectively.

In addition, in the facsimile apparatus 1, an amount of tone shifting in the area judged as white or black may be determined. When an image is made by adding a character to an image in an apparatus performing image encoding processing, white is set to tone value 255 and color transformation processing is performed for only a pixel having tone value 255 and thereby a natural image such as most of photographs can be encoded as it is because the natural image never has tone value 255. However, when the white level is made have a width as mentioned above and when the image encoding processing cannot help being simultaneously performed for the character area and the natural image area, an amount of color shifting in the natural image area has different depending on an amount of tone shifting of a pixel in the width of the white level, in other words, depending on the tone shifting method.

Figure 5:
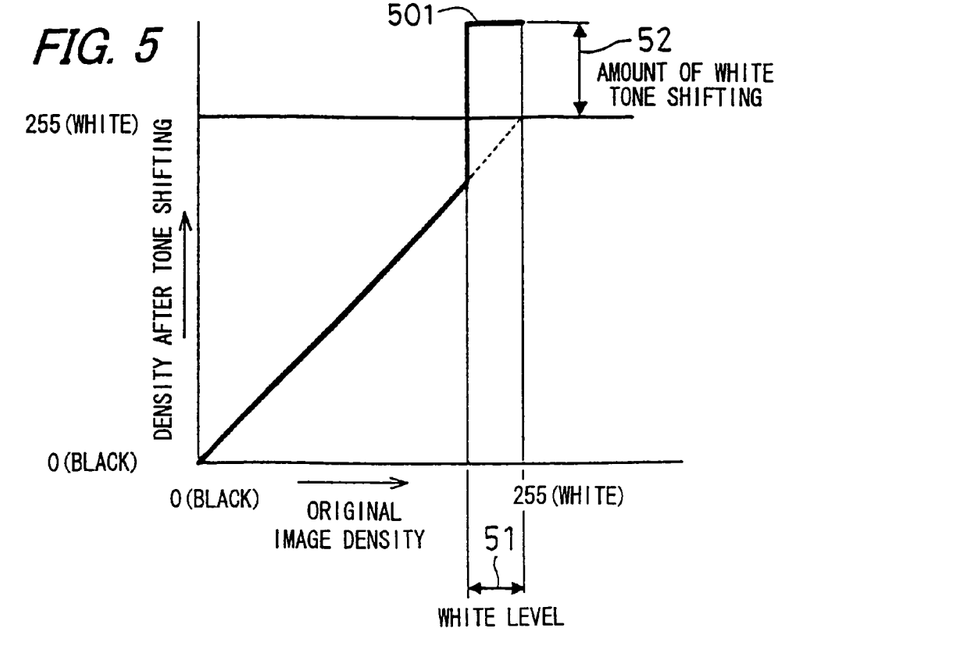
FIG. 5 is a view showing an example of a tone shifting method on a white level.

FIG. 5 is a view showing an example of a tone shifting method on a white level. In FIG. 5, every portion corresponding to a tone value defined as a white level 51 are shifted to a portion given by adding a predetermined amount of white tone shifting 52 to the tone value 255 corresponding to the whitest color on color representation in the inverse direction against black, in other words, in the direction in which the tone value is increased. In FIG. 5, the horizontal axis denotes a density value (tone value) of the original image and a vertical axis denotes a density value (tone value) of the shifted original image. Only larger amount of white tone shifting 52 than the tone value 255 (white) is set to a tone 501 defined as a white level 51.

Figure 6:
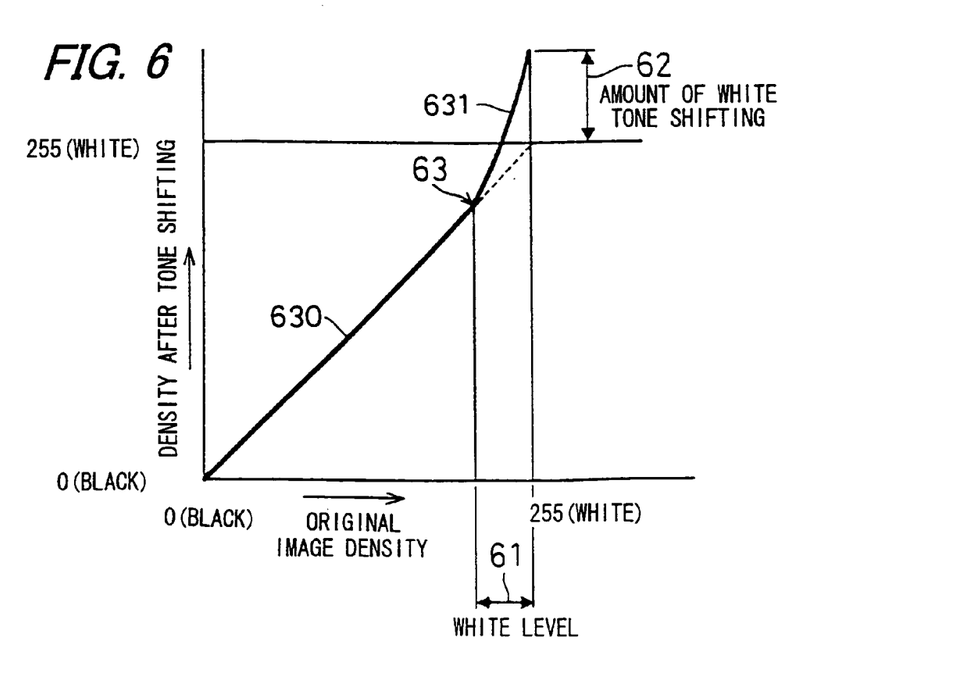
FIG. 6 is a view showing another example of the tone shifting method on the white level.

FIG. 6 is a view showing another example of the tone shifting method on the white level. In FIG. 6, the horizontal axis denotes a density value (tone value) of the original image and a vertical axis denotes a density value (tone value) of the shifted original image. In FIG. 6, the more a tone is close to the whitest color on color representation, the more the tone is changed to the opposite side of black. According to concrete description about the example, tone shifting processing is performed for a tone value on a portion specified as a white level 61 on the original image by connecting a boundary value 63 on the side of smaller tone value 630 to a tone value made by adding only amount of white tone shifting 62 to the tome value 255 corresponding to the whitest color on color representation with an appropriate curved line (corresponding to a curved line 631 in FIG. 6) or an appropriate straight line so that the tone value of the pixel on the white level 61 can be located on this curved line or straight line. Changing a shape of this curved line or straight line 631 enables a point of compromise between change of a color of the natural image and conflicting characteristics like an amount/a degree of density of mosquito noise occurring around the character image to be found.

The amounts of white tone shifting 52 and 62 may be determined by analyzing the image. When the extent of the tone of the image is narrow, the extent of the density of mosquito noise of the encoded and decoded image also becomes narrow. Therefore, a value obtained by multiplying a constant coefficient by a value on the basis of the whole density of the original image is defined as an amount of tone shifting. In other words, the amount of tone shifting is a value obtained by multiplying a constant coefficient by a value obtained by subtracting the minimum density value from the maximum density value of the image. According to an experiment, it becomes clear that mosquito noise becomes indistinctive when the amount of tone shifting is set to a half of the whole extent of tone.

In addition, in the color facsimile apparatus 1, The control apparatus 14 performs normal procedure of decoding JPEG, in other words, processing for proceeding in an inverse direction in a state where the step S5 is omitted on the flowchart in FIG. 2 and then an image generated after the image to which encoding processing is applied is compared with the original image read by the image reading apparatus and thereby the tone difference which is the color difference between the decoded image and the original image can be obtained and the amount of white tone shifting 52 shown in FIG. 5 or the amount of white tone shifting 62 shown in FIG. 6 can be corrected so that the tone difference can fit in the predetermined extent of the color difference. The process of this correction may be defined so that the process can be repeated in a constant number of times and may have warning occur to the user by using the display apparatus 111 or voice when a shift value of the tone between the decoded image generated by decoding processing and the original image, in other words, the amount of occurrence of mosquito noise does not fit in a desired extent in spite of repeating this correction. Thus, the user can instruct how to perform the next processing, for instance, sending the image as it is or setting is performed again by having the warning occur.

In addition, when the image compressed by the image encoding method in the invention is a binary image, for instance, a binary image comprising only two colors (white and black), the tone value which is the color representing value of each pixel comprises only 255 representing white and 0 representing black and the above mentioned tone shifting processing which defines the tone values of white and black as appropriate tone values outside the extent of tone values is performed and thereby encoding processing is performed in a state where every tone value of the pixel causing mosquito noise is defined as a tone value outside of the extent of tone and therefore, non-loss image having no mosquito noise can be obtained at the time of performing the encoding processing.

The facsimile apparatus 1 may be configured so that the encoded image is decoded and the decoded image is output by the display apparatus 111 and the printing apparatus 16 or the like and occurrence of mosquito noise can be confirmed. Since the user can confirm the amount of mosquito noise by confirming the decoded image, the user can make a decision on changing the constant values such as the amounts of white tone shifting 52 and 62 or the like or sending the image as it is on the basis of the image.

In addition, in the facsimile apparatus 1, the user may select whether the above-mentioned color transformation processing is performed. Whether the color transformation processing is performed is selected by using the dial key 112 or the operation key 113 or the like. Thus, the user judges whether the color transformation processing is performed and thereby, for instance, an unimportant image or the like can be sent as it is and efficient sending can be realized in the facsimile apparatus 1.

In addition, the image encoding method in the invention can be applied to not only the facsimile apparatus 1, but various types of other image apparatuses, for instance, such as a personal computer, a digital camera and a digital video camera or the like. In the case of adding a character or the like in an apparatus or in an internal portion of the connected apparatus or in a case like this case, color transformation processing is performed for the area of this added character and thereby mosquito noise can be efficiently reduced. In addition, when a character portion is clear in an image input from an external portion like an image displayed by WWW browser reading HTML, for instance, by which a character and an image file are specified or a character portion is clear in an image in the memory, applying color transformation processing to the character portion enables efficient image encoding processing to be performed.

As mentioned above, according to the invention, since processing for reducing mosquito noise is performed on the side of compression of the image, the encoded image can be decoded on the side of decoding the image without consciousness about mosquito noise without providing a special apparatus. In addition, the invention can be also applied to the image encoding method performing wavelet transformation without dividing pixels into blocks and can be applied to all the image encoding methods by which mosquito noise occurs by compression of the high frequency component.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

As mentioned above, according to the invention, when the two areas are represented in the color space, a cluster which is collection of pixels in one area represented in the color space and a cluster which is collection of pixels in another area represented in the color space are changed so that the color representing value of pixel in each of the areas is changed in the direction of separating the two clusters and then the color component is transformed to the spatial frequency area and an amount of information is compressed by the entropy compression method and therefore, reduction of mosquito noise can be realized without request for change on the side of decoding the image and the invention can be used for many applications.

Besides, According to the invention, since the color transformation processing is applied to a character area in which a character with high possibility of occurrence of mosquito noise, the mosquito noise can be efficiently reduced.

In addition, according to the invention, after color transformation processing is performed for changing the color representing value of the pixel corresponding to white to the inverse direction for the direction of black, the color component is transformed to the spatial frequency area and an amount of information is compressed by the entropy compression method and therefore, reduction of mosquito noise can be realized without request for change on the side of decoding the image and the invention can be used for many applications.

In addition, according to the invention, after color transformation processing is performed for changing the color representing value of the pixel corresponding to black to the inverse direction for the direction of white, the color component is transformed to the spatial frequency area and an amount of information is compressed by the entropy compression method and therefore, reduction of mosquito noise can be realized without request for change on the side of decoding the image and the invention can be used for many applications.

In addition, according to the invention, when the character area and the background area are represented in the color space, a cluster which is collection of pixels in the character area represented in the color space and a cluster which is collection of pixels in the background area represented in the color space are changed so that the color representing value of pixel in each of the areas is changed in the direction of separating the two clusters and then the color component is transformed to the spatial frequency area and an amount of information is compressed by the entropy compression method and therefore, reduction of mosquito noise can be realized without request for change on the side of decoding the image and the invention can be used for many applications.

Besides, According to the invention, the color transformation processing is performed at the time of encoding image data with characters used for a date, a comment, a calendar or the like added to an image input from for instance a record of the addresser in a facsimile apparatus and the memory and an imaging apparatus or the like and therefore, even when a character is written in the image later, mosquito noise can be reduced.

In addition, according to the invention, since the color transformation processing is performed for an image specified as a character area, for instance, an image represented on the basis of markup language specifying a character file and a image file, the character area can be easily identified and efficient processing can be performed for the character area with high possibility of occurrence of mosquito noise.

Besides, according to the invention, an area is divided into an image area and a character area and performing the color transformation processing for the divided character area enables efficient processing to be performed.

Besides, according to the invention, a user's specifying the character area enables a place for which the color transformation processing is performed to be specified and also enables efficient processing to be performed.

In addition, according to the invention, when the color representing value of each pixel is equal to or less than the previously set density, the color representing value is judged as being a pixel color representing value corresponding to white and therefore, the pixel corresponding to white can be also defined and the color transformation processing can be performed for an image in which the whitest color does not exist on color representation.

In addition, according to the invention, when the color representing value of each pixel is equal to or more than the previously set density, the color representing value is judged as being a pixel color representing value corresponding to black and therefore, the pixel corresponding to white can be also defined and the color transformation processing can be performed for an image in which the blackest color does not exist on color representation.

Besides, according to the invention, distribution of lightness of the image to which the color transformation processing is applied is obtained and a part of each pixel having lightness within an extent from a maximum lightness of the distribution to lightness added by a predetermined value or a part having lightness with a rate equal to or more than a predetermined rate within an extent between the maximum lightness and a minimum lightness is judged as being a color representing value corresponding to white and therefore, the color transformation processing can be performed even for an image in which the whitest color does not exist on color representation.

Besides, according to the invention, distribution of lightness of the image to which the color transformation processing is applied is obtained and a part of each pixel having lightness within an extent from the minimum lightness of the distribution to lightness subtracted by a predetermined value or a part having lightness with a rate equal to or less than a predetermined rate within an extent between the maximum lightness and a minimum lightness is judged as being a color representing value corresponding to black and therefore, the color transformation processing can be performed even for an image in which the blackest color does not exist on color representation.

In addition, according to the invention, the color representing value of the pixel corresponding to white is changed to the value corresponding to the whitest color on color representation with only the predetermined value in an inverse direction for the direction of black and therefore, adjusting the predetermined value enables mosquito noise to be efficiently reduced.

In addition, according to the invention, the color representing value of the pixel corresponding to black is changed to the value corresponding to the blackest color on color representation with only the predetermined value in an inverse direction for the direction of white and therefore, adjusting the predetermined value enables mosquito noise to be efficiently reduced.

In addition, according to the invention, the closer to the whitest color on color representation the color representing value of the pixel corresponding to white is, the further the color representing value is changed to a value in the inverse direction for the direction of black and therefore, mosquito noise can be preferably reduced.

In addition, according to the invention, the closer to the blackest color on color representation the color representing value of the pixel corresponding to black is, the further the color representing value is changed to a value in the inverse direction for the direction of white and therefore, mosquito noise can be preferably reduced.

In addition, according to the invention, the color transformation processing is performed on the basis of the value obtained by multiplying the constant coefficient by difference between the minimum density value and the maximum density value of the image and therefore, adjusting the coefficient enables mosquito noise to be efficiently reduced.

According to the invention, when the original image is compared with an image reproduced by performing inverse transformation of the image after the image was compressed once and color difference between the both images is equal to or more than a predetermined color difference, the constant coefficient is changed until the color difference between the both images fits in the extent of the predetermined color difference and therefore, mosquito noise can be surely reduced.

According to the invention, when the color difference between the image decoded after encoding the image and the original image does not fit in the extent of the predetermined color difference in spite of changing the constant coefficient at predetermined number of times According to the invention, an image reproduced by performing inverse transformation for the image encoded is displayed by a display apparatus and a printing apparatus or the like and thereby the image can be confirmed and decision of succeeding processing can be performed.

According to the invention, whether the color transformation processing is performed can be set by the user and therefore, performing the color transformation processing is set so that the color transformation processing is not performed for an image not including an edge such as a character and the color transformation processing is performed only for an image including an edge such as a character and, thereby processing for encoding an image can be efficiently performed.

In addition, according to the invention, it becomes possible to reduce mosquito noise of the image handled by an image apparatus handling the image, for instance, such as a communicating apparatus, an information processing apparatus and a graphic apparatus, for instance, corresponding to a facsimile apparatus, a personal computer and a digital camera respectively.

In addition, according to the invention, white and black tone values of a binary image comprising only two colors (white and black) are encoded in a state where these tone values are changed as appropriate tone values outside the extent of tone values and thereby non-loss image having no mosquito noise can be obtained at the time of performing the encoding processing.

The invention claimed is:

1. An image encoding apparatus, comprising:
a processor, said processor encoding image data of an original image by performing steps comprising:
transforming a color component to a spatial frequency area;
a color transformation processing for changing at least one of color representing values of colors belonging to two clusters corresponding to two areas represented in a color space to a color representing value in a direction of separating the two clusters; and
compressing an amount of information of image data by an entropy compression method,
wherein, in the color transformation processing, a color representing value of each pixel is judged as being corresponding to white when the color representing value of each pixel is equal to or more than a previously set density, and a color representing value of a pixel corresponding to white is changed to an inverse direction for the direction of black, on the basis of a value obtained by multiplying a constant coefficient by a difference between a minimum density value and a maximum density value of an image on the color transformation processing,
wherein when the original image is compared with an image reproduced by performing inverse transformation of the encoded image and a color difference between both images is equal to or more than a predetermined color difference, the constant coefficient is changed until the color difference between both images fits in an extent of the predetermined color difference, and
wherein a warning is given to a user when the color difference between the reproduced image and the original image does not fall in the extent of the predetermined color difference in spite of changing the constant coefficient a predetermined number of times.

* * * * *